(12) United States Patent
Coble et al.

(10) Patent No.: US 11,225,366 B2
(45) Date of Patent: Jan. 18, 2022

(54) BUILDING PANEL SLEEVE PACKAGING

(71) Applicant: ARMSTRONG WORLD INDUSTRIES, INC., Lancaster, PA (US)

(72) Inventors: Amanda Worley Coble, Bainbridge, PA (US); James R. Johnson, Lizella, GA (US); Gary A. Grinsted, Macon, GA (US)

(73) Assignee: AWI Licensing LLC, Wilmington, DE (US)

( * ) Notice: Subject to any disclaimer, the term of this patent is extended or adjusted under 35 U.S.C. 154(b) by 94 days.

(21) Appl. No.: 16/256,033

(22) Filed: Jan. 24, 2019

(65) Prior Publication Data
US 2019/0225399 A1    Jul. 25, 2019

Related U.S. Application Data

(60) Provisional application No. 62/621,358, filed on Jan. 24, 2018.

(51) Int. Cl.
*B65D 75/00* (2006.01)
*B65B 53/00* (2006.01)
(Continued)

(52) U.S. Cl.
CPC ............ *B65D 75/004* (2013.01); *B29C 65/52* (2013.01); *B65B 5/06* (2013.01); *B65B 23/20* (2013.01);
(Continued)

(58) Field of Classification Search
CPC ........... B65B 5/06; B65B 11/02; B65B 23/20; B65B 51/02; B65B 51/06; B65B 53/00; B65B 53/02; B65B 2220/16; B65B 61/22; B65D 5/50; B65D 63/10; B65D 71/066; B65D 71/08; B65D 71/70; B65D 75/04;
(Continued)

(56) References Cited

U.S. PATENT DOCUMENTS

| 2,043,419 | A | * | 6/1936 | Robinson | B65D 75/14 |
| | | | | | 206/454 |
| 2,117,194 | A | * | 5/1938 | McElroy | B65D 85/46 |
| | | | | | 206/322 |

(Continued)

FOREIGN PATENT DOCUMENTS

| GB | 2122160 A | * | 1/1984 | ............. B65D 71/00 |
| JP | 02019265 A | * | 1/1990 | ............. B65D 71/04 |

(Continued)

OTHER PUBLICATIONS

International Search Report for Related Application PCTUS/US2019/014876 dated May 15, 2019.

*Primary Examiner* — Bryon P Gehman
(74) *Attorney, Agent, or Firm* — Craig M. Sterner

(57) ABSTRACT

Described herein is a packaging system comprising a sleeve having a plurality of sides, an open top, and an open bottom, each of the sides having an inner surface, an inner liner located on the inner surfaces of the sides of the sleeve, the inner liner having an inner surface that defines a cavity, a plurality of building panels located in the cavity, and an outer wrapping surrounding at least a portion of the sleeve and at least a portion of the plurality of building panels.

20 Claims, 4 Drawing Sheets

(51) Int. Cl.
*B65B 5/06* (2006.01)
*B65D 85/46* (2006.01)
*B65B 23/20* (2006.01)
*B65B 51/02* (2006.01)
*B65B 61/22* (2006.01)
*B65B 53/02* (2006.01)
*B65D 71/06* (2006.01)
*B65G 49/06* (2006.01)
*B29C 65/52* (2006.01)

(52) U.S. Cl.
CPC .............. *B65B 51/02* (2013.01); *B65B 53/00* (2013.01); *B65B 53/02* (2013.01); *B65B 61/22* (2013.01); *B65D 71/066* (2013.01); *B65D 85/46* (2013.01); *B65G 49/068* (2013.01); *B65B 2220/16* (2013.01)

(58) Field of Classification Search
CPC ........ B65D 81/02; B65D 81/30; B65D 85/00; B65D 85/38; B65D 85/46; B65D 85/86; B65D 71/06; B65D 75/00; B65D 75/004; B65G 49/068; B29C 65/52
USPC ........ 206/321–325, 497, 499, 521, 591–594; 181/292–295
See application file for complete search history.

(56) References Cited

U.S. PATENT DOCUMENTS

| | | | |
|---|---|---|---|
| 2,291,645 A | 6/1939 | Nordquist | |
| 2,535,422 A * | 12/1950 | Jones | B65D 75/02 |
| | | | 206/449 |
| 2,778,489 A | 10/1953 | Shoemaker | |
| 3,003,296 A | 3/1959 | Feldkamp et al. | |
| 2,998,129 A * | 8/1961 | Bekins | B65D 25/04 |
| | | | 206/523 |
| 3,088,588 A * | 5/1963 | Feichter | E04F 13/142 |
| | | | 206/322 |
| 3,288,353 A * | 11/1966 | McCullough | B65D 81/03 |
| | | | 206/591 |
| 3,403,033 A | 9/1968 | Griner | |
| 4,409,776 A | 10/1983 | Usui | |
| 5,564,254 A | 10/1996 | Thimon et al. | |
| 8,511,022 B2 * | 8/2013 | Curtin | H05K 7/20745 |
| | | | 52/302.1 |
| 8,720,684 B2 * | 5/2014 | Balmer | B65B 11/004 |
| | | | 206/321 |
| 9,914,582 B2 * | 3/2018 | Jorgensen | B65D 5/5088 |
| 2014/0060965 A1 * | 3/2014 | Polonen | G10K 11/168 |
| | | | 181/292 |
| 2016/0039589 A1 | 2/2016 | Theriault et al. | |
| 2016/0068332 A1 | 3/2016 | Flynn et al. | |

FOREIGN PATENT DOCUMENTS

| | | |
|---|---|---|
| JP | 05-049616 U | 6/1993 |
| JP | 05-170221 A | 7/1993 |
| JP | 07-024786 U | 5/1995 |
| JP | 10-194351 A | 7/1998 |

\* cited by examiner

BUILDING PANEL SLEEVE PACKAGING

CROSS-REFERENCE TO RELATED APPLICATIONS

This application claims the benefit of U.S. Provisional Application No. 62/621,358, filed on Jan. 24, 2018. The disclosure of the above application is incorporated herein by reference.

FIELD

The present invention relates to packaging. More particularly, embodiments of the present invention relate to packaging for panels or tiles such as, for example, ceiling tiles.

BACKGROUND

Many types of ceiling (and other building) systems use tiles of varying size and composition. Some such tiles are acoustic tiles, or other tiles, that are fragile and susceptible to damage during shipping. Various packaging methods have been used to contain tiles for shipping, with varying degrees of success as far as protecting the tiles from damage.

The corners and edges of fragile tiles are particularly susceptible to damage during shipping. A packaging system that better protects fragile tiles, including their corners and edges, from damage during shipping is needed.

Accordingly, improved systems and methods for packaging ceiling or other building tiles are provided by the invention. These systems and methods provide a package that includes a strong outer sleeve and a cushioning inner liner to protect fragile tiles.

SUMMARY

In one aspect of the invention, a packaging system comprising: a sleeve having a plurality of sides, an open top, and an open bottom, each of the sides having an inner surface; an inner liner located on the inner surfaces of the sides of the sleeve, the inner liner having an inner surface that defines a cavity; a plurality of building panels located in the cavity; and an outer wrapping surrounding at least a portion of the sleeve and at least a portion of the plurality of building panels.

In another aspect of the invention, a packaging assembly for containing a plurality of building tiles, the packaging comprising: a packaging comprising: a sleeve having a plurality of sides, an open top, and an open bottom, each of the sides having an inner surface; an inner liner located on the inner surfaces of the sides of the sleeve, the inner liner having an inner surface that defines a cavity, the cavity being configured such that the plurality of building tiles fit in the cavity; and an outer wrapping configured to surround at least a portion of the sleeve.

Other embodiments of the present invention include a method of transporting building tiles, the method comprising: a) inserting a plurality of building tiles into an open-ended cavity of a packaging, such that the plurality of building tiles are in a stacked arrangement within the open-ended cavity; b) applying an outer wrapping to the packaging such that the outer wrapping contacts both the plurality of building tiles and the plurality of sides of the packaging.

Further areas of applicability of the present invention will become apparent from the detailed description provided hereinafter. It should be understood that the detailed description and specific examples, while indicating preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

Figure 1:
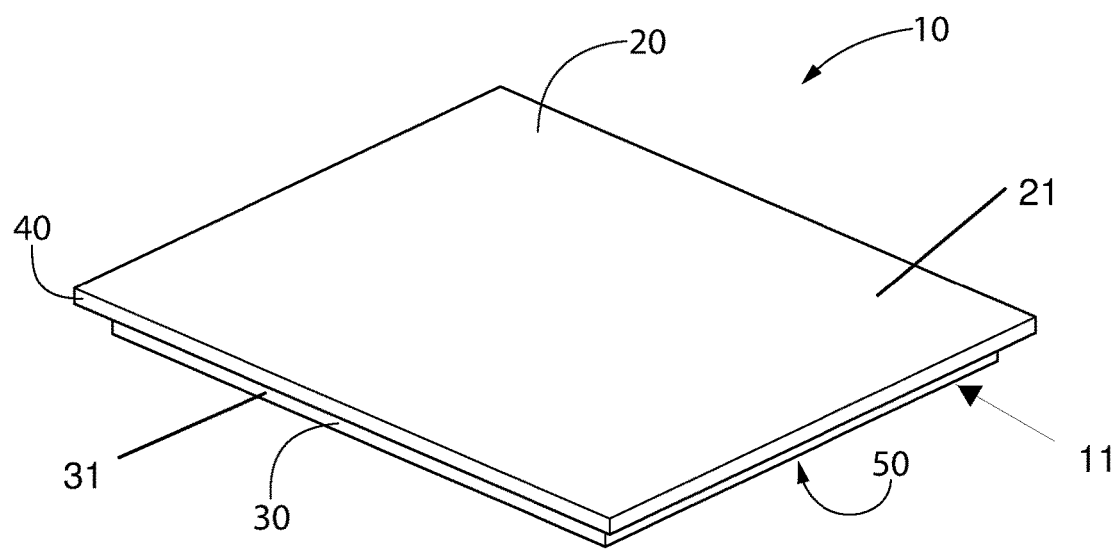
FIG. 1 is a perspective view of ceiling tile that can be packaged using packaging in accordance with exemplary embodiments of the invention.

All drawings are schematic and not necessarily to scale. Parts given a reference numerical designation in one figure may be considered to be the same parts where they appear in other figures without a numerical designation for brevity unless specifically labeled with a different part number and described herein.

DETAILED DESCRIPTION

The following description of the preferred embodiment(s) is merely exemplary in nature and is in no way intended to limit the invention, its application, or uses.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "connected," "coupled," "interconnected," and similar refer to a relationship wherein structures are secured or attached to one another either directly or indirectly through intervening structures, as well as both movable or rigid attachments or relationships, unless expressly described otherwise. The term "fixed" refers to two structures that cannot be separated without damaging one of the structures. The term "filled" refers to a state that includes completely filled or partially filled.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

Embodiments of the invention provide a simple, inexpensive, and effective form of packaging materials that are in tile form such as, for example, ceiling tiles. Embodiments are particularly useful for packaging tiles, such as acoustic ceiling tiles, that have fragile edges and corners that are easily broken.

FIG. 1 shows an example of a ceiling tile 10 having a first major surface 21 opposite a second major surface 50. The ceiling tile 10 may comprise a first planar portion 20 and a second planar portion 30. The first planar portion 20 may comprise the first major surface 21. The second planar portion 30 may comprise a second major surface 50.

The first planar portion 20 may comprises an outer edge 40 that defines the perimeter of the first planar portion 20. Specifically, the outer edge 40 of the first planar portion 20 may define a perimeter of the first major surface 21 of the first planar portion 20. The first major surface 21 may have a first surface area as defined by the perimeter formed by the outer edge 40 of the first planar portion 20.

The second planar portion 30 may comprise an outer edge 31 that defines the perimeter of the second planar portion 30. Specifically, the outer edge 31 of the second planar portion 30 may define a perimeter of the second major surface 50 of the second planar portion 30. The second major surface 50 may have a second surface area as defined by the perimeter formed by the outer edge 31 of the second planar portion 30.

The first perimeter may be greater than the second perimeter. In other embodiments, the first perimeter and the second perimeter may be substantially equal. The first surface area may be greater than the second surface area. In such embodiments, the combination of the outer edge 40 of the first planar portion 20 and the outer edge 31 of the second planar portion 30 may form a stepped edge geometry 11 of the ceiling tile 10. Such ceiling tiles 10 may be referred to as a "tegular ceiling tile" 10.

Although not shown, the present invention includes other embodiments, where the first surface area and the second surface area may be substantially equal. In such embodiments, the overall side surface of the ceiling tile 10 may be substantially planar—i.e., comprise a non-stepped geometry.

The ceiling tile 10 of according to the present invention may be installed in a suspended grid to form a ceiling in, for example, an office space.

The outer edge 40 of the first planar portion 20 may form the overall perimeter of tile 10. The first major surface 21 of the first planar portion 20 may be substantially parallel to the second major surface 50 of the second planar portion 30.

Figure 2:
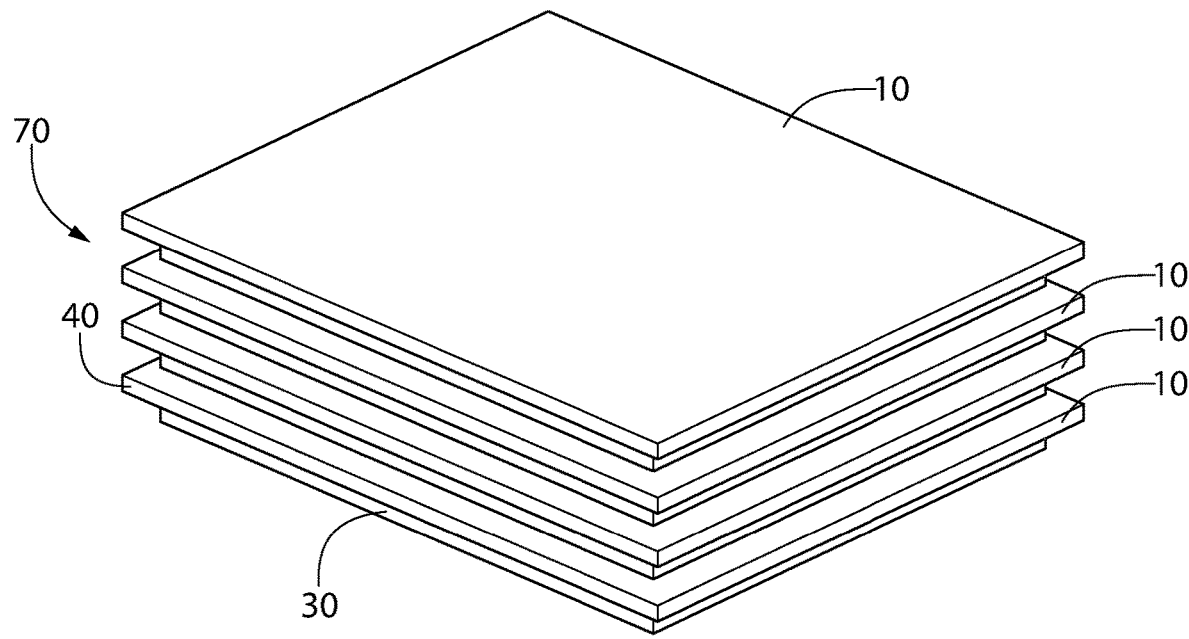
FIG. 2 is a perspective view of a stack of ceiling tiles that can be packaged using packaging in accordance with exemplary embodiments of the invention.

FIG. 2 shows a stack 70 of, in this example, four tiles 10. For shipping purposes, a plurality of tiles 10 can be assembled into a stack such as stack 70. Methods other than those of the invention, such as simply banding the tiles together, can lead to damaged tiles due to edges 40 being contacted by moving equipment or other hard objects. Also, banding or other packing methods can directly cause damage to fragile tiles due to overtightening or other incorrect procedures.

Figure 6:
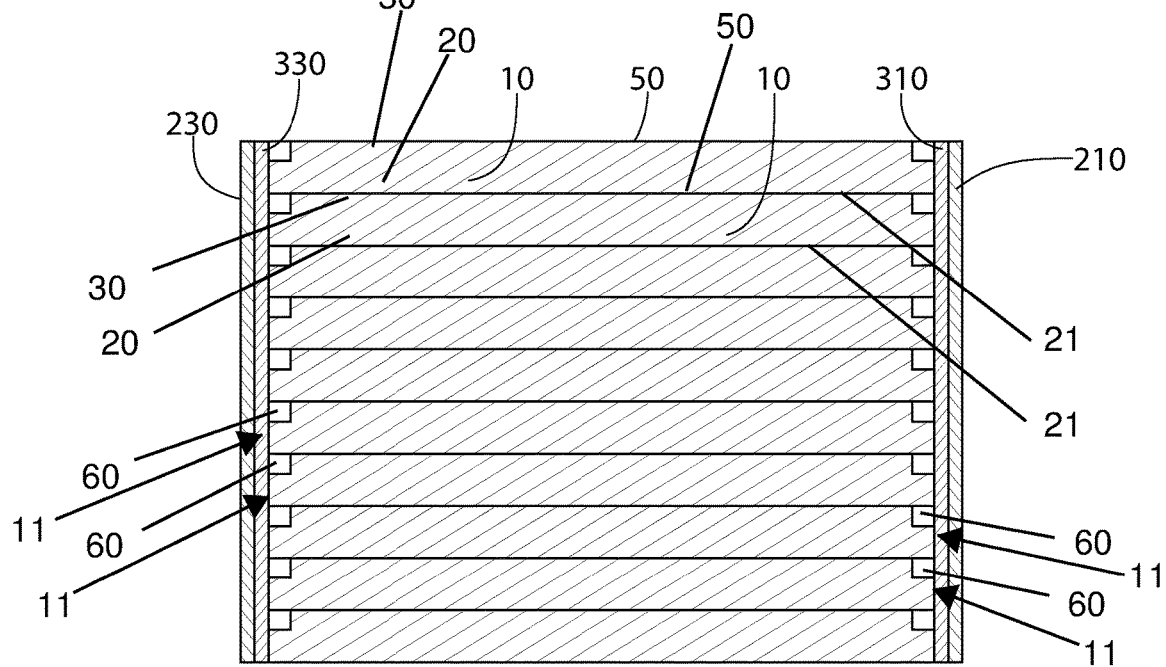
FIG. 6 is a cross-sectional view of the packaging and tiles shown in FIG. 4.

Referring now to FIG. 6, in the stacked configuration 70, the plurality of tiles 10 may be arranged such that the first major surface 21 of at least one tile 10 faces the second major surface 50 of an adjacent tile 10. In some embodiments, the plurality of tiles 10 may be arranged such that the first major surface 21 of at least one tile 10 is in direct contact the second major surface 50 of an adjacent tile 10. In other embodiment, the plurality of tiles 10 may be arranged such that the first major surface 21 of at least one tile 10 is in indirect contact the second major surface 50 of an adjacent tile 10. Indirect contact may refer to one or more intermediate layers being positioned between the first major surface 21 of one tile 10 and the second major surface 50 of an adjacent tile 10.

Although not pictured, other embodiments of the present invention include that the stacked configuration 70 may comprise the plurality of tiles 10 arranged such that the first major surface 21 of at least one tile 10 faces the first major surface 21 of an adjacent tile 10. In some embodiments, the plurality of tiles 10 may be arranged such that the first major surface 21 of at least one tile 10 is in direct contact the first major surface 21 of an adjacent tile 10. In other embodiment, the plurality of tiles 10 may be arranged such that the first major surface 21 of the first planar portion 20 is in indirect contact the first major surface 21 of an adjacent tile 10.

Although not pictured, other embodiments of the present invention include that the stacked configuration 70 may comprise the plurality of tiles 10 arranged such that the second major surface 50 of at least one tile 10 faces the second major surface 50 of an adjacent tile 10. In some embodiments, the plurality of tiles 10 may be arranged such that the second major surface 50 of at least one tile 10 is in direct contact the second major surface 50 of an adjacent tile 10. In other embodiment, the plurality of tiles 10 may be arranged such that the second major surface 50 is in indirect contact the second major surface 50 of an adjacent tile 10.

Figure 3:
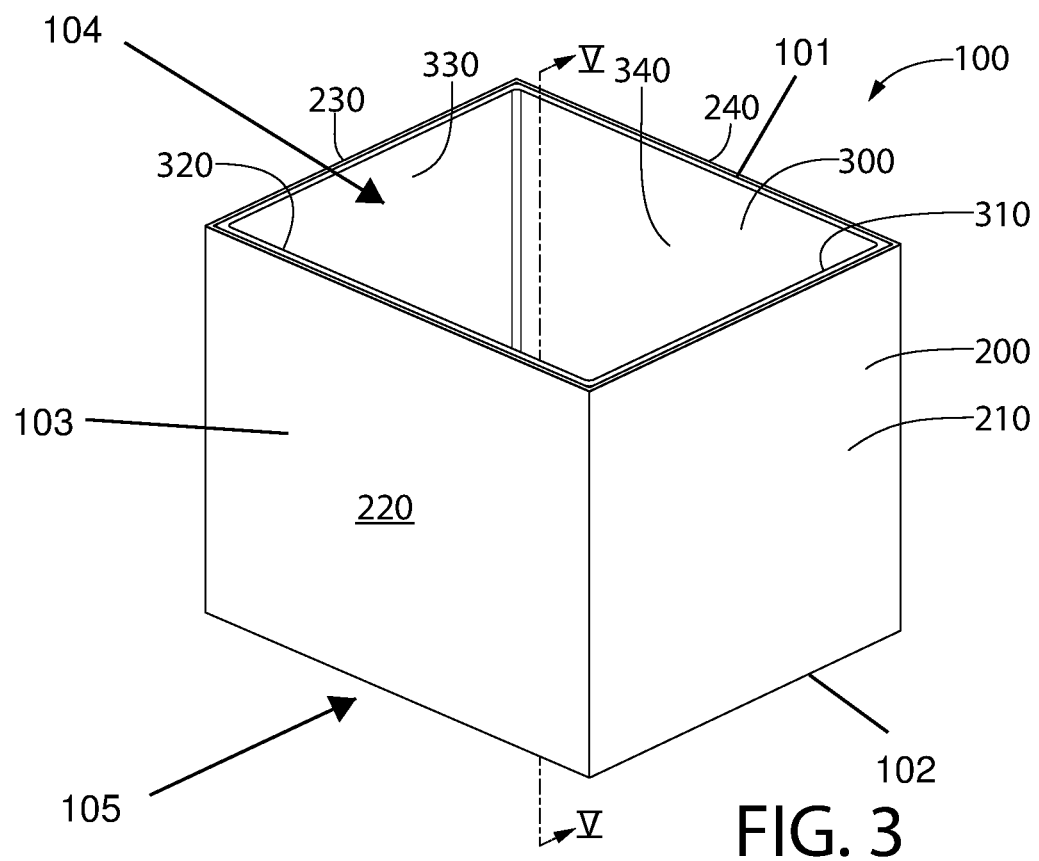
FIG. 3 is a perspective view of an example of packaging in accordance with exemplary embodiments of the invention.

FIG. 3 shows an example of packaging 100 in accordance with exemplary embodiments of the invention. The packaging may comprise a top end 101 that is opposite a bottom end 102, as well as side walls extending between the top end 101 and bottom end 102. The packaging 100 may extend vertically along an axis A-A. The top end 101 may comprise a top opening 104 that opens up into a cavity 400—as described in greater detail herein. The bottom end 102 may comprise a bottom opening 105 that opens up into a cavity 400—as described in greater detail herein. The axis A-A may intersect both the top opening 104 and the bottom opening 105 of the packaging 100.

Packaging 100 may comprise an assembly of an outer sleeve 200 (also referred to as a "sleeve") and a liner 300. The sleeve 200 may be formed of a first material. Non-limiting examples of the first material may include cardboard—such as corrugated cardboard, single thickness corrugated cardboard, a double (or more) thickness of corrugated cardboard, a solid plastic material, a corrugated plastic material, or any other protective material.

The sleeve 200 may have four sides 210, 220, 230, 240 that, in this example, form a rectangular parallelepiped. Each of the sides 210, 220, 230, 240 in this example is a rectangle. In the case of packaging square tiles, the upper edges of each of the sides 210, 220, 230, 240 would be the same length. In particular examples, the dimensions of sleeve 200 are different to accommodate tiles of a particular size. The first material may have a first hardness. The first material may have a first density.

The sleeve 200 may comprise a top end 201 that is opposite a bottom end 202. Each of the sides 210, 220, 230, 240 may extend between the top end 201 and bottom end 202 of the sleeve 200. The top end 201 of the sleeve 200 may comprise a first opening 205. The bottom end 202 of the sleeve 200 may comprise a second opening 206. The axis A-A may intersect both the first opening 205 and the second opening 206 of the sleeve 200. The top opening 104 of the packaging 100 may comprise the first opening 205 of the sleeve 200. The bottom opening 105 of the packaging 100 may comprise the second opening 206 of the sleeve 200.

The sleeve 200 can be, for example, a single thickness. In some embodiments, sleeve 200 is made of a material that is resistant to puncturing and/or resistant to impact. In the case of a corrugated, or other collapsible, material, the outer surface of sleeve 200 can deform without the inner surface of the same side of sleeve 200 deforming. This partial deformation can provide protection to tiles 10 from impacts to packaging 100. Some corrugated cardboard used in embodiments of the invention can have a strength in the range of 23ECT-32ECT or 200 lbs. for a sleeve sized to accept 2'×2' square tiles or for a sleeve sized to accept 2'×4' tiles. Corrugated cardboard of this, or other, strength can be used for these sizes or other sizes.

Lining the inside of sides 210, 220, 230, 240 is a liner 300. Liner 300 can be formed from a second material. The first and second material may be different. The second material may have a second hardness. In some embodiments, the second hardness may be equal to the first hardness. In other embodiments, the second hardness may be less than first hardness. The second material may have a second density. The second density may be less than first density. The second density may be greater than first density.

Non-limiting examples of the second material may include a foam material—such as polymeric foam. Non-limiting examples of polymeric foam may include polyurethane foam. Liner 300 can be, for example, a dense foam or a less dense foam depending on the strength of the tiles being protected by packaging 100. In the case of very fragile tiles, a less dense/more compliant foam can be used to help protect fragile edges of the tiles. Liner 300 has, in this example, four sides 310, 320, 330, 340 that correspond to the sides 210, 220, 230, 240 of sleeve 200.

Liner 300 can be a material other than foam such as, for example, a cellulosic material—such as paper or expanded paper—plastic, expanded plastic, fibrous material, or any other cushioning material that will protect tiles 10 from damage.

Foams used for liner 300 can be closed cell, or open cell, or a combination of closed and open cell. Some examples use a foam that is a majority closed cell and a minority open cell. Some examples use a foam that is between 70% and 90% closed cell. Some examples use a foam that is 80% closed cell. In some examples, liner 300 is in the range of 1/8" to 3/8" thick in an uncompressed state. In some examples, liner 300 is approximately 1/4" thick in an uncompressed state. Other thicknesses of liner 300 can be used as appropriate for the type of tiles 10 being packaged.

Sleeve 200 in this example is open on both the top and the bottom ends 201, 202, as shown in FIG. 3. The open top and bottoms 201, 202 allow sleeve 200 (with liner 300) to be easily moved over stack 70 of tiles 10 to position stack 70 in the cavity. The open top and bottom allow air to freely move though sleeve 200 when sleeve 200 and liner 300 are slid into position over stack 70, which permits sleeve 200 and liner 300 to be moved into position around stack 70 without having to displace any captured air. This provides a protective packaging for tiles 10 that can be easily and quickly positioned around stack 70.

The inner surfaces 310, 320, 330, 340 of liner 300 define a cavity 400 in sleeve 200 in which tiles 10 are positioned. The liner 300 may comprise a top end 301 that is opposite a bottom end 302. Each of the sides 310, 320, 330, 340 may extend between the top end 301 and bottom end 302 of the sleeve 300. The top end 301 of the liner 300 may comprise a first opening 305. The bottom end 302 of the liner 300 may comprise a second opening 306.

The top opening 104 of the packaging 100 may comprise the first opening 305 of the liner 300. The bottom opening 105 of the packaging 100 may comprise the second opening 306 of the liner 300.

The axis A-A may intersect both the first opening 305 and the second opening 306 of the liner 300. The cavity 400 may extend vertically along the axis A-A axis such that the axis A-A intersects both the first opening 305 and the second opening 306 of the liner 300. The cavity 400 may extend vertically along the axis A-A axis such that the axis A-A intersects both the first opening 205 and the second opening 206 of the sleeve 200.

Figure 4:
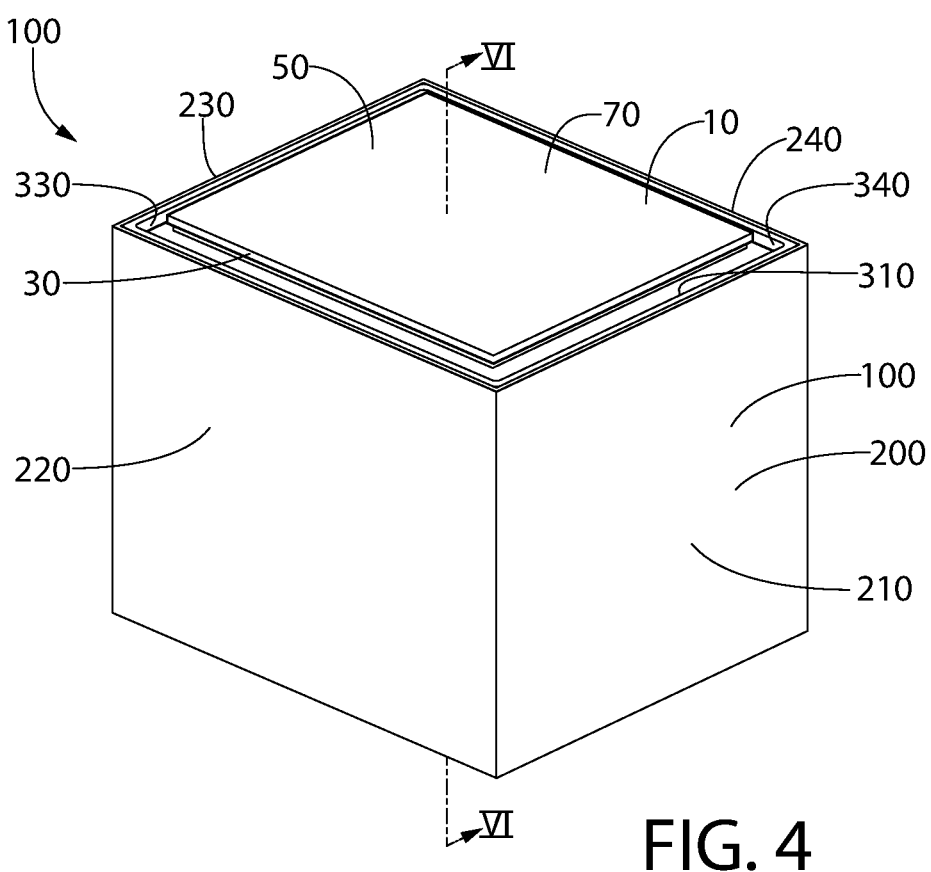
FIG. 4 is a perspective view of a stack of ceiling tiles packaged in an example of packaging in accordance with exemplary embodiments of the invention.

FIG. 4 shows an example of packaging 100 in position around stack 70 of tiles 10. Surface 50 of second portion 30 of tile 10 is shown directed upward in this embodiment. In this embodiment, edges 40 of tiles 10 contact sides 310, 320, 330, 340 of liner 300 to hold tiles 10 securely in position so that tiles 10 do not move relative to liner 300 and sleeve 200. By securely holding tiles 10 in position, liner 300 and sleeve 200 help protect edges 40 against damage due to moving relative to and impacting packaging 100. Different embodiments exert different amounts of force on edges 40 of tiles 10 to hold them in place. The appropriate amount of force can depend on the strength and fragility of tiles 10.

Liner 300 can be fixed to sleeve 200 or it can be separate. In some embodiments, liner 300 is adhered to sleeve 200 by a hot melt adhesive or other adhesive. Liner 300 can be one piece or several pieces. In some embodiments, liner 300 is one piece that covers the entire inner surfaces of sides 210, 220, 230, 240 of sleeve 200. Other embodiments use four separate pieces of liner 300, one covering each of sides 210, 220, 230, 240 of sleeve 200. In some embodiments, liner 300 extends into each of the inside corners of sleeve 200. In other embodiments, liner 300 does not extend into the inside corners of sleeve 200 to provide space for the corners of tiles 10 where edges 40 meet. The corners of tiles 10 where edges 40 meet can be particularly fragile and particularly susceptible to damage and, in some cases, better protection of the corners is provided by providing a space into which the corners can extend without contacting liner 300 or sleeve 200.

An example of the material that can be used for liner 300 is a polyethylene foam product that includes about 84-88% polyethylene resin, less than or about 5% hydrocarbon foaming agents, less than or about 4% talc, less than or about 2% foam processing aid, and less than or about 5% colorants or amide anti-static additives. Some examples include antimony trioxide/halogenated organic material.

Some embodiments have a three-layer composite structure that includes a second sleeve inside the liner such that the structure is, for example, corrugated cardboard-liner-corrugated cardboard. This structure can include any of the alternate materials discussed in this specification. Some embodiments have a three-layer composite structure that includes a paper layer inside the liner such that the structure is, for example, corrugated cardboard-liner-paper. The paper layer can provide a smoother surface than foam to facilitate packaging 100 sliding over tiles 10. Other materials can be used for this layer instead of paper.

Figure 5:
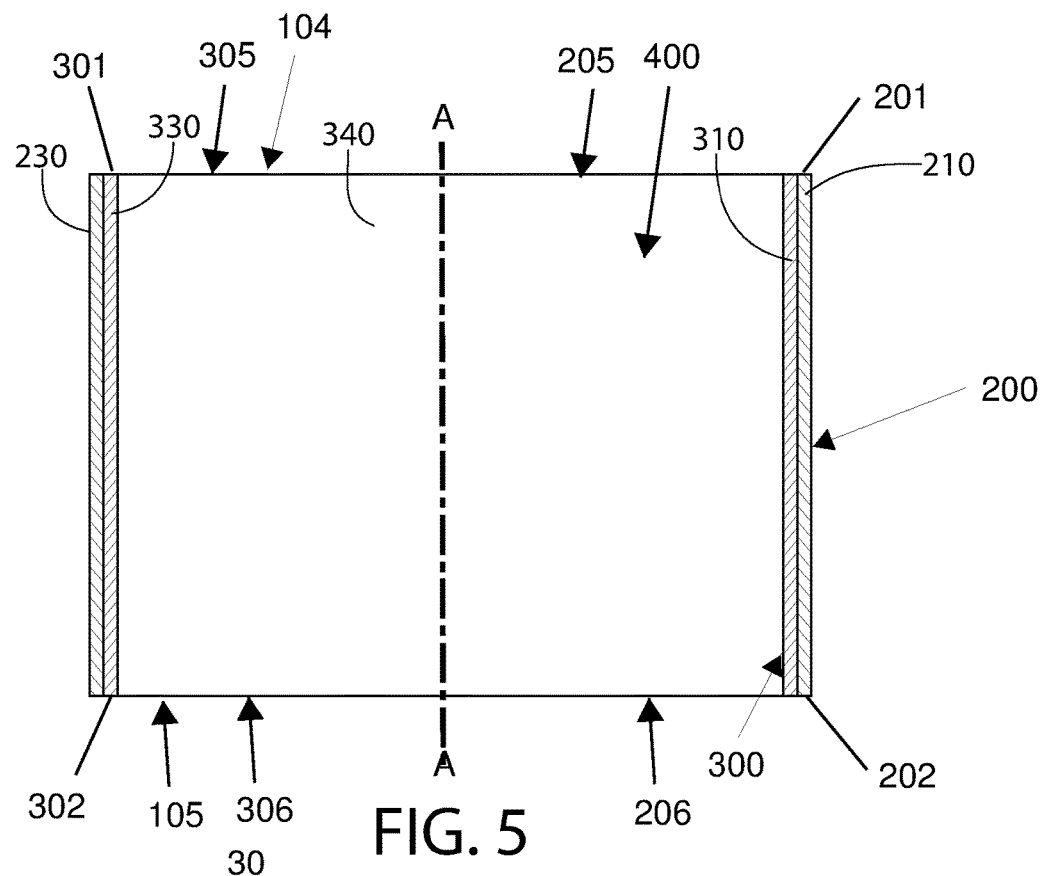
FIG. 5 is a cross-sectional view of the packaging shown in FIG. 3.

FIG. 5 shows a cross-section taken along section plane V-V of packaging 100 shown in FIG. 3. FIG. 5 shows side 310 of liner 300 contacting side 210 of sleeve 200 and shows side 330 of liner 300 contracting side 230 of sleeve 200. In this example, sides 310, 330 are shown as having the same thickness as sides 210, 230. In other embodiments, sides 310, 330 are thicker than sides 210, 230, and in still other embodiments, sides 310, 330 are thinner than sides 210, 230.

As an example, in embodiments where liner 300 is a more compliant than sleeve 200, liner 300 can, for example, be thicker than sleeve 200 in order to absorb movement of tiles 10 without damaging tiles 10.

In the example shown in FIG. 5, sides 310, 330 of liner 300 contact sides 210, 230 of sleeve 200 along the entire height of sleeve 200. In other embodiments, sides 310, 330 of liner 300 contact sides 210, 230 of sleeve 200 for less than the entire height of sleeve 200. In still other embodiments, sides 310, 330 of liner 300 are longer than sides 210, 230 of sleeve 200 and extend beyond the top and/or the bottom of sleeve 200.

FIG. 6 shows a cross-section taken along section plane VI-VI of packaging 100 and stack 70 of tiles 10 shown in FIG. 4. FIG. 6 shows side 310 of liner 300 contacting side 210 of sleeve 200, and shows side 330 of liner 300 contracting side 230 of sleeve 200. In this example, sides 310, 330 are shown as having the same thickness as sides 210, 230. In other embodiments, sides 310, 330 are thicker than sides 210, 230, and in still other embodiments, sides 310, 330 are thinner than sides 210, 230. FIG. 6 shows stack 70 having ten tiles 10. Other examples contain fewer or more tiles 10. In the examples shown in FIGS. 4 and 6, packaging 100 is open at the top and bottom, and enclosed by sides 210, 220, 230, 240 of sleeve 200.

Furthermore, for the ceiling tiles 10 comprises the stepped edge geometry 11, the stack 70 of ceiling tiles 10 may comprise a plurality of grooves 60 that are formed by the offset in perimeters formed by the outer edge 40 of the first planar portion 20 and the outer edge 31 of the second planar portion 30. According to this embodiment, at least a portion of the outer edge 40 of each first planar portion 20 may be in contact with the inner surface of the sleeve 300 while the outer edge 31 of each second planar portion 30 is offset from the inner surface of the sleeve by a distance having a non-zero value.

Figure 7:
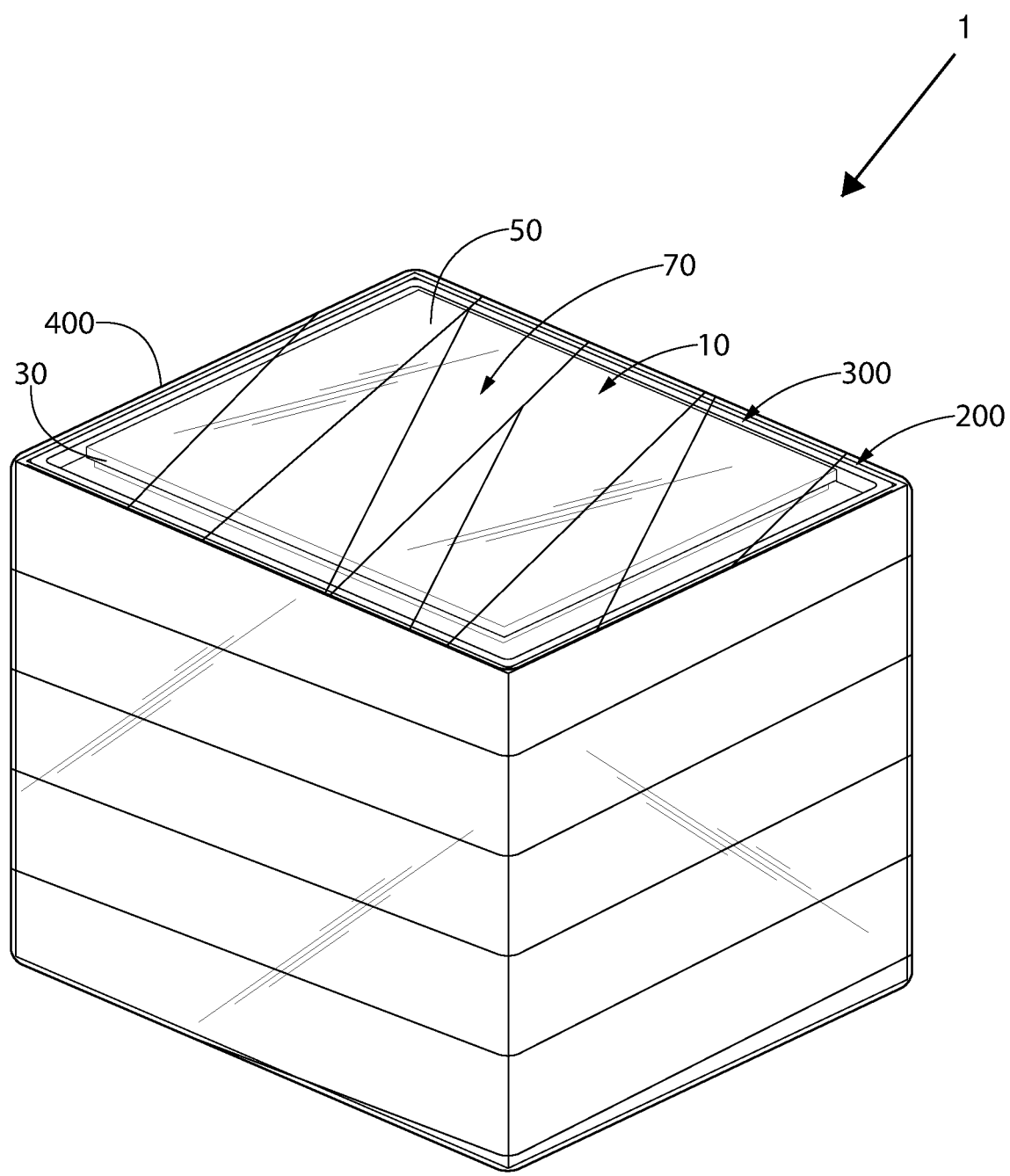
FIG. 7 is a perspective view of a stack of ceiling tiles packaged in an example of packaging in accordance with exemplary embodiments of the invention.

FIG. 7 shows an example of packaging assembly 1 comprising the packaging 100 and an outer wrapping 400 of, in this example, a clear plastic material. The packaging assembly 1 may contain the stack 70 of tiles 10—thereby forming a packaging system. The outer wrapping 400 may completely surround the sleeve 200 and stack 70.

In some embodiments, wrapping 400 is "shrink wrap" that is thermally activated to shrink around and tightly encase sleeve 200 and stack 70. In the example shown in FIG. 5, the uppermost tile 10 of stack 70 is visible through wrapping 400. In this example, wrapping 400 keeps tiles 10 in position inside sleeve 200. In other examples, a protective sheet of cardboard or other material can be laid on top of the uppermost tile 10 before wrapping 400 is installed in order to provide additional protection to the uppermost tile 10. In some embodiments, a similar sheet can be provided on the underside of stack 70 to protect the lowermost tile 10 in stack 70.

While the foregoing description and drawings represent exemplary embodiments of the present disclosure, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made within the scope of the present disclosure.

One skilled in the art will further appreciate that the embodiments may be used with many modifications of structure, arrangement, proportions, sizes, materials, and components and otherwise, used in the practice of the disclosure, which are particularly adapted to specific environments and operative requirements without departing from the principles described herein. The presently disclosed embodiments are therefore to be considered in all respects as illustrative and not restrictive. The appended claims should be construed broadly, to include other variants and embodiments of the disclosure, which may be made by those skilled in the art without departing from the scope and range of equivalents. In addition, all combinations of any and all of the features described in the disclosure, in any combination, are part of the invention.

What is claimed is:

1. A packaging system comprising:
    a sleeve having a plurality of sides, an open top, and an open bottom, each of the sides having an inner surface;
    an inner liner located on the inner surfaces of the sides of the sleeve, the inner liner having an inner surface that defines a cavity;
    a plurality of building panels located in the cavity;
        wherein each of the building panels comprises a first planar portion and a second planar portion, the first planar portion comprises an outer edge that defines the perimeter of the first planar portion, the second planar portion comprises an outer edge that defines the perimeter of the second planar portion,
        wherein the perimeter of the first planar portion is greater than the perimeter of the second planar portion;
    an outer wrapping surrounding at least a portion of the sleeve and at least a portion of the plurality of building panels; and
    wherein the sleeve comprises cardboard and the inner liner comprises a polyethylene foam material comprising 84-88% polyethylene resin, less than or about 5% hydrocarbon foaming agents, less than or about 4% talc, less than or about 2% foam processing aid, and less than or about 5% colorants.

2. The packaging system according to claim 1, wherein the sleeve is formed from a first material, the inner liner is formed from a second material, and the outer wrapping is formed from a third material wherein the first material, the second material, and the third material are different.

3. The packaging system according to claim 2, wherein the first material has a first hardness and the second material has a second hardness, the first hardness being greater than the second hardness.

4. The packaging system according to claim 2, wherein the first material is selected from the group consisting of cardboard, plastic, and combinations thereof, and wherein the second material is selected from the group consisting of polymeric foam, a fibrous material, a cellulosic material, and a non-foamed polymeric material.

5. The packaging system according to claim 2, wherein the third material is a polymeric film.

6. The packaging system according to claim 1, wherein the sleeve extends vertically about an axis that intersects both the open top and the open bottom of the sleeve, wherein the axis also intersects the plurality of building panels.

7. The packaging system according to claim 6, wherein each of the plurality of building panels comprise a first major surface opposite a second major surface, and the plurality of building panels are in a stacked configuration such that the axis intersects both the first and second major surfaces of the plurality of building panels.

8. The packaging system according to claim 1, wherein each of the plurality of building panels comprise a first major surface opposite a second major surface and a side surface extending there-between, wherein at least one side surface of the plurality of building panels contacts the inner surface of the liner.

9. The packaging system according to claim 8, wherein at least one side surface of the plurality of building panels is in free-floating contact with the inner surface of the liner.

10. The packaging system according to claim 1,
wherein each of the plurality of building panels comprise a first major surface opposite a second major surface and a side surface extending there-between,
wherein the side surface comprises a first portion adjacent the first major surface and a second portion adjacent the second major surface;
wherein the first portion of the side surface is in contact with the inner surface of the liner and the second portion is horizontally offset from the inner surface of the liner by a positive non-zero distance.

11. A packaging assembly for containing a plurality of building tiles, the packaging comprising:
a packaging comprising:
a sleeve having a plurality of sides, an open top, and an open bottom, each of the sides having an inner surface;
an inner liner located on the inner surfaces of the sides of the sleeve, the inner liner having an inner surface that defines a cavity, the cavity being configured such that the plurality of building tiles fit in the cavity;
an outer wrapping configured to surround at least a portion of the sleeve; and
wherein each of the building tiles comprises a first planar portion and a second planar portion, the first planar portion comprises an outer edge that defines the perimeter of the first planar portion, the second planar portion comprises an outer edge that defines the perimeter of the second planar portion,
wherein the perimeter of the first planar portion is greater than the perimeter of the second planar portion; and
wherein the sleeve comprises cardboard and the inner liner comprises a polyethylene foam material comprising 84-88% polyethylene resin, less than or about 5% hydrocarbon foaming agents, less than or about 4% talc, less than or about 2% foam processing aid, and less than or about 5% colorants.

12. The packaging assembly according to claim 11, wherein the sleeve is formed from a first material having a first hardness and the inner liner is formed from a second material having a second hardness, the first hardness being greater than the second hardness.

13. The packaging assembly according to claim 11, wherein the sleeve is formed from a first material selected from the group consisting of cardboard, plastic, and combinations thereof.

14. The packaging assembly according to claim 11, wherein the sleeve is formed from a second material selected from the group consisting of polymeric foam, a fibrous material, a cellulosic material, and a non-foamed polymeric material.

15. The packaging assembly according to claim 11, wherein the inner liner extends to the open top of the sleeve.

16. The packaging assembly according to claim 11, wherein the inner liner extends to the open bottom of the sleeve.

17. The packaging assembly according to claim 11, wherein an interface exists between the plurality of sides of the sleeve and the inner liner, wherein adhesive is present in the interface.

18. A method of transporting building tiles, the method comprising:
a) inserting a plurality of building tiles into an open-ended cavity of a packaging, such that the plurality of building tiles are in a stacked arrangement within the open-ended cavity;
wherein the packaging comprises an outer sleeve and a liner,
the outer sleeve having a plurality of sides, an open top, and an open bottom, each of the sides having an inner surface, the outer sleeve formed from a first material, and
the liner comprising a top end comprising a first opening and opposite to a bottom end which comprises a second opening, sides extending therebetween, the sides of the liner in contact with the inner surfaces of the outer sleeve, and formed from a second material; and
b) applying an outer wrapping to the packaging such that the outer wrapping contacts both the plurality of building tiles and the plurality of sides of the packaging,
wherein the first material comprises cardboard and the second material comprises a foam material.

19. The method according to claim 18, wherein after the inserting step of a), at least one of the plurality of building tiles contacts the liner.

20. The method according to claim 19, wherein after the applying step of b), the outer wrapping fully covers the open top and the open bottom of the packaging.

* * * * *